(12) United States Patent
Isurin et al.

(10) Patent No.: US 9,871,450 B2
(45) Date of Patent: Jan. 16, 2018

(54) ISOLATED STEP-UP CONVERTER

(71) Applicant: VANNER, INC., Hilliard, OH (US)

(72) Inventors: Alexander Isurin, Dublin, OH (US);
Alexander Cook, Dublin, OH (US)

(73) Assignee: VANNER, INC., Hilliard, OH (US)

( * ) Notice: Subject to any disclaimer, the term of this patent is extended or adjusted under 35 U.S.C. 154(b) by 18 days.

(21) Appl. No.: 15/494,063

(22) Filed: Apr. 21, 2017

(65) Prior Publication Data

US 2017/0310221 A1 Oct. 26, 2017

Related U.S. Application Data

(60) Provisional application No. 62/326,893, filed on Apr. 25, 2016.

(51) Int. Cl.
| | |
|---|---|
| *H02M 3/335* | (2006.01) |
| *H02M 3/158* | (2006.01) |
| *H02M 7/537* | (2006.01) |
| *H02M 1/08* | (2006.01) |
| *H02M 1/00* | (2006.01) |

(52) U.S. Cl.
CPC .......... *H02M 3/335* (2013.01); *H02M 1/083* (2013.01); *H02M 3/158* (2013.01); *H02M 7/537* (2013.01); *H02M 2001/0048* (2013.01)

(58) Field of Classification Search
CPC .............. H02M 2001/0048; H02M 2001/0058
See application file for complete search history.

(56) References Cited

U.S. PATENT DOCUMENTS

| | | | | |
|---|---|---|---|---|
| 9,118,241 B2 * | 8/2015 | Broussev | ................. | H02M 1/15 |
| 9,240,723 B2 * | 1/2016 | Boysen | ............... | H02M 3/3376 |
| 9,564,775 B2 * | 2/2017 | Liu | | |
| 2001/0009516 A1 * | 7/2001 | Kato | ....................... | H02M 1/34 |
| | | | | 363/17 |
| 2002/0000923 A1 * | 1/2002 | Nishikawa | ........ | H02M 3/33569 |
| | | | | 341/22 |
| 2005/0152159 A1 * | 7/2005 | Isurin | ...................... | H02M 1/36 |
| | | | | 363/17 |
| 2006/0139823 A1 * | 6/2006 | Shoji | ....................... | H02M 1/34 |
| | | | | 361/56 |
| 2007/0159114 A1 * | 7/2007 | Chang | ................ | H05B 41/2822 |
| | | | | 315/274 |
| 2008/0309406 A1 * | 12/2008 | Jonkman | ................... | H03F 1/26 |
| | | | | 330/251 |
| 2010/0226154 A1 * | 9/2010 | Leu | ........................ | H02M 1/34 |
| | | | | 363/106 |

(Continued)

OTHER PUBLICATIONS

F. Forest et al., "Design of a 28V-to-300V12KW Multi-cell Interleaved Flyback Converter Using Intercell Transformer", IEEE Transactions on Power Electronics, 25(8), 1966-1974pp, Sep. 2010.
S. Bali et al., "Modular Snubberless Bidirectional Soft-Switching Current-Fed Dual 6-pack DC/DC Converter", IEEE ECCE, Sep. 2014, 2043-2050pp.

(Continued)

*Primary Examiner* — Yusef Ahmed
(74) *Attorney, Agent, or Firm* — James R. Eley; Ronald J. Koch; Eley Law Firm Co. LPA

(57) ABSTRACT

An isolated step-up converter having first and second stages is described herein. The second stage can provide either DC or AC output based on the various topologies described. Resonance inductors and capacitors are used and tuned to a commutation frequency in some embodiments. Capacitors and inductors are also used in the first stage.

6 Claims, 19 Drawing Sheets

Proposed Topology

(56) References Cited

U.S. PATENT DOCUMENTS

| | | | | |
|---|---|---|---|---|
| 2011/0038181 A1* | 2/2011 | Yan | H02M 1/32 | 363/17 |
| 2012/0163035 A1* | 6/2012 | Song | H02M 3/33584 | 363/17 |
| 2012/0287678 A1* | 11/2012 | Xu | H02M 3/158 | 363/17 |
| 2013/0051102 A1* | 2/2013 | Huang | H02M 7/217 | 363/127 |
| 2013/0070504 A1* | 3/2013 | Xu | H02M 7/5388 | 363/132 |
| 2015/0103561 A1* | 4/2015 | Dai | H02M 3/3353 | 363/17 |
| 2015/0109829 A1* | 4/2015 | Usami | H02M 1/126 | 363/17 |
| 2015/0263634 A1* | 9/2015 | Fu | H02M 3/33569 | 363/21.02 |
| 2017/0025962 A1* | 1/2017 | Davidson | H02M 1/44 | |

OTHER PUBLICATIONS

Z. Wang et al., "A Soft Switching Three-Phase Current-Fed Bidirectional DC-DC Converter With High Efficiency Over a Wide Input Voltage Range", IEEE Transactions on Power Electronics, 27(2), 669-684pp, Feb. 2012.

A. Isurin et al., "A Novel Resonant Converter Topology and its Application", IEEE 32nd Annual PESC, Jun. 2001, pp. 1039-1044, vol. 2.

J.M. Kwon et al., "High Step-up Active-Clamp Converter With Input-Current Doubler and Output-Voltage Doubler for Fuel Cell Power Systems", IEEE Transactions on Power Electronics, 24(1), 108-115pp, Jan. 2009.

F. Z. Peng et al., "A New ZVS Bidirectional DC-DC Converter for Fuel Cell and Battery Application", IEEE Transactions on Power Electronics, 19(1), 54-65pp, Jan. 2004.

Y. Shi et al., "A Single-Phase Grid-Connected PV Converter with Minimal DC-Link Capacitor and Low-Frequency Ripple-Free maximum Point Tracking", IEEE ECCE, Sep. 2013, 2385-2390pp.

* cited by examiner

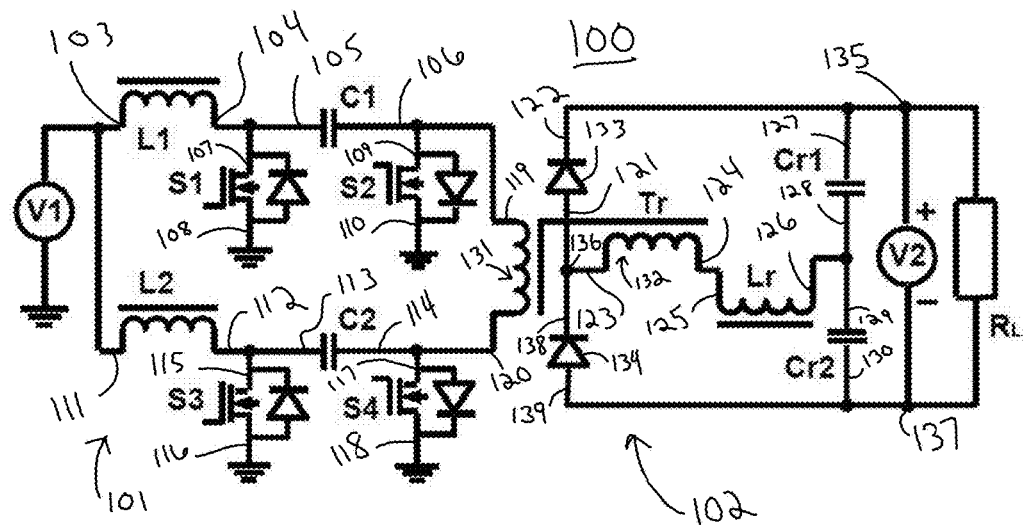
Fig.1 Proposed Topology
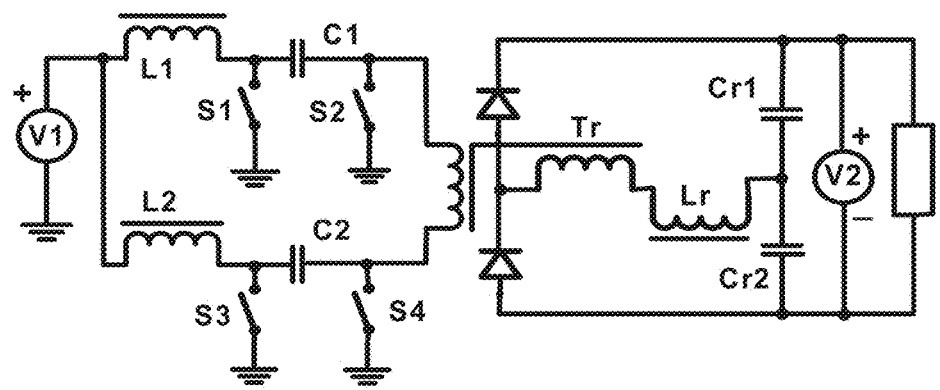
Fig.1A (simplified version)

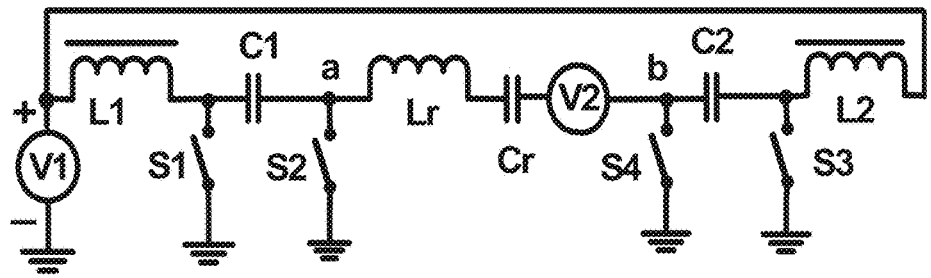
Fig.1B (simplified version)
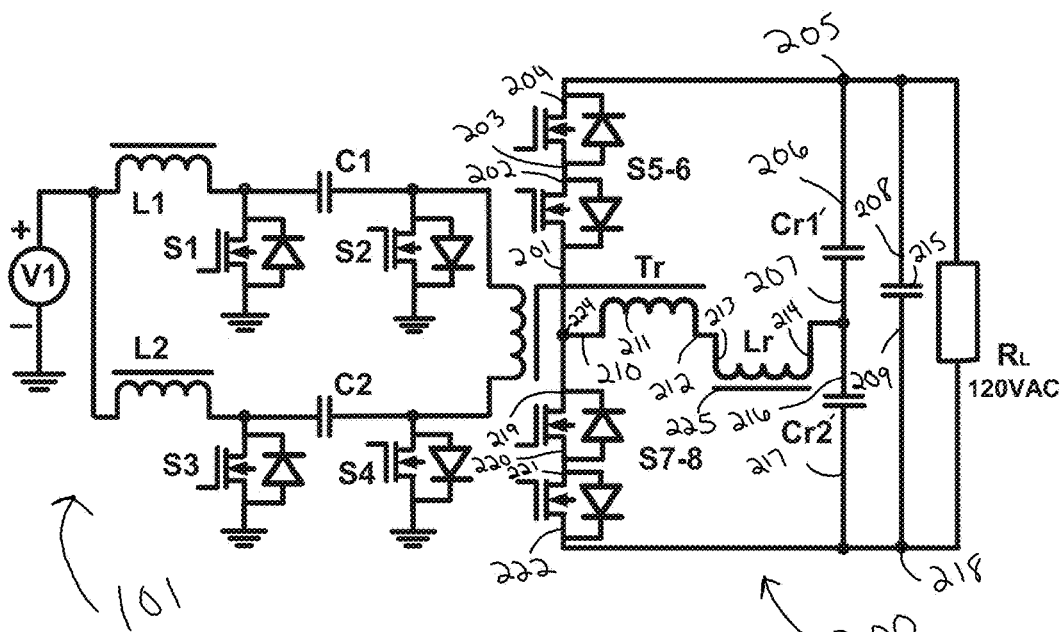
Fig.2 DC-AC converter

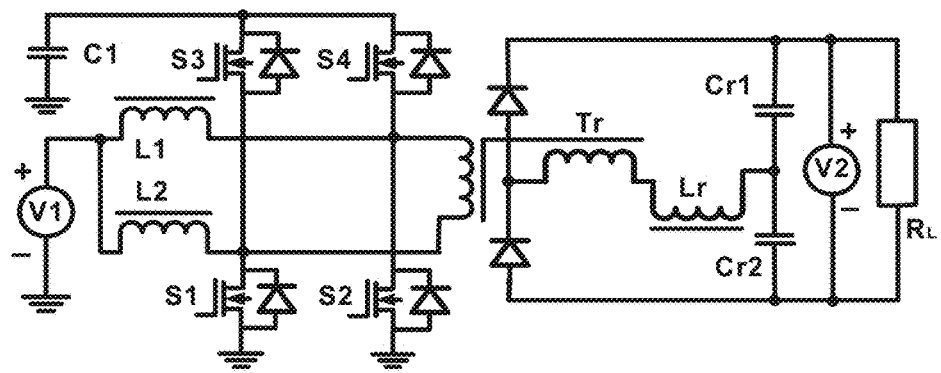
(PRIOR ART)
Fig.3 Topology N1
IEEE Transactions on Power Electronics
24(1) 108-115pp, 2009
IEEE Transactions on Power Electronics
19(1) 54-65pp, 2004
ECCE2013, 2385-2390pp

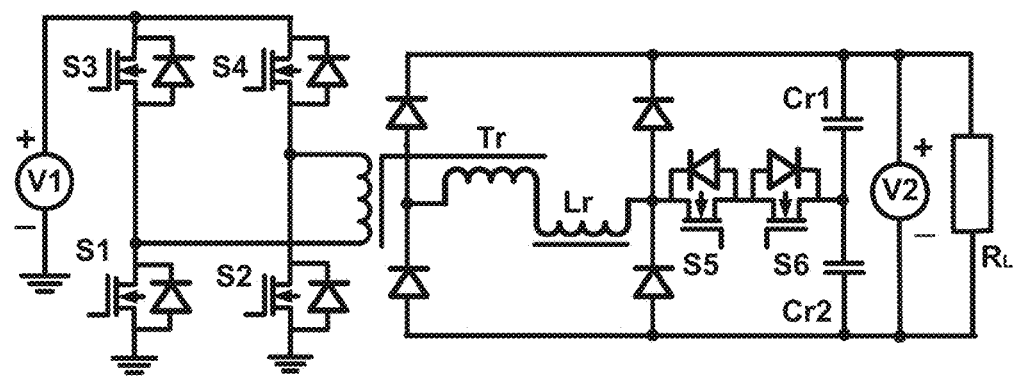
(PRIOR ART)
Fig.4 Topology N2
PESC2001 pp.1039 - 1044 vol.2

Time t0 to t1
Discharge C1 and
Charge C2

Duty cycle 50%

Time t1 to t2
Next half cycle
Discharge C2 and
Charge C1

Duty cycle 50%

Time t0 to t1
Discharge C1 and Charge C2

Duty cycle 40%

Time t1 to t2
Discharge Lr
Charge C1 and C2

Duty cycle 40%

Time t2 to t3
Charge C1 and C2

Duty cycle 40%

Time t3 to t4
Next half cycle
Charge C1 and
Discharge C2

Duty cycle 40%

Time t0 to t1
Discharge C1 and
Charge C2

Duty cycle 60%

Time t1 to t2
Discharge Lr
Charge L1 and L2

Duty cycle 60%

Time t2 to t3
Charge L1 and L2

Duty cycle 60%

Time t3 to t4
Next half cycle
Charge C1 and
Discharge C2

Duty cycle 60%

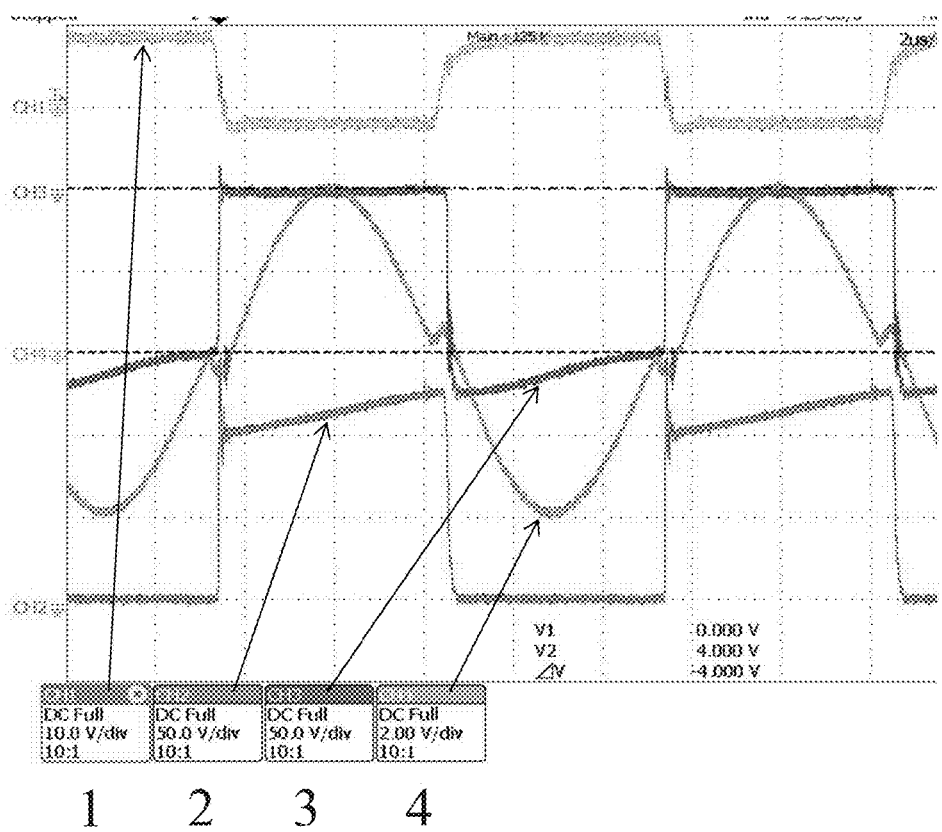
FIG. 17A (Duty cycle 50% Pout-10kW)

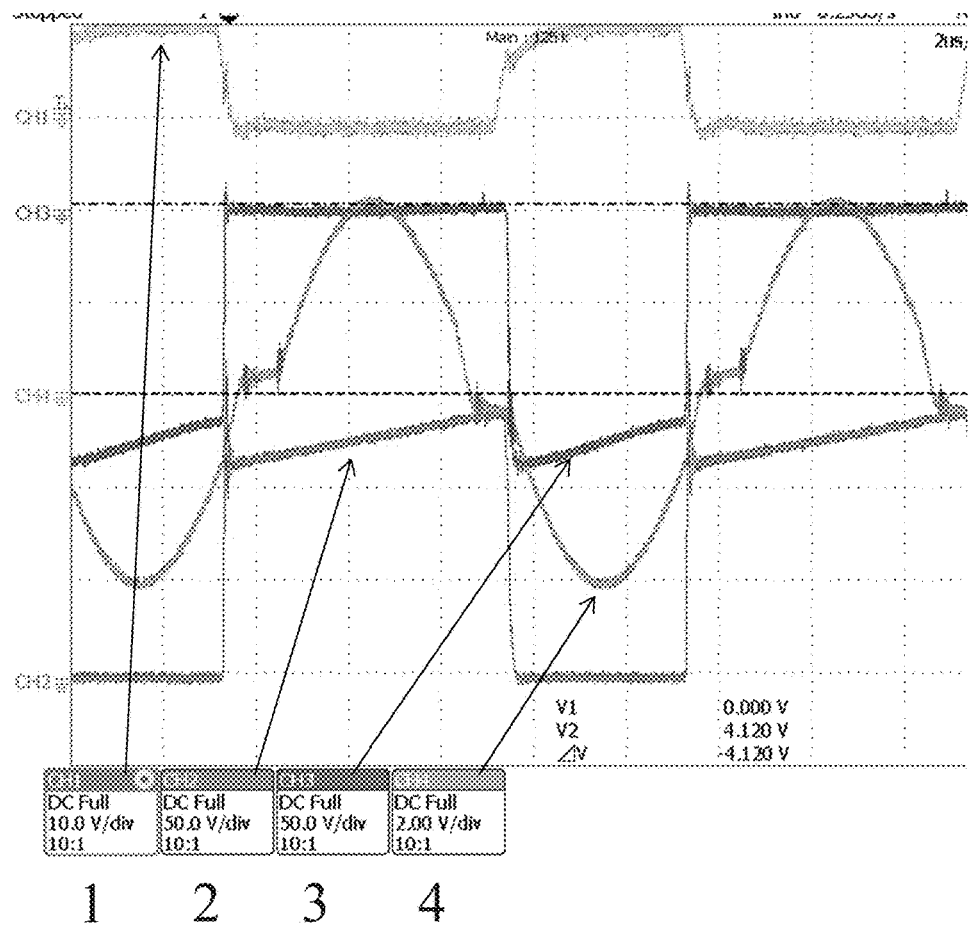
FIG. 17B (Duty cycle 40% Pout-11kW)

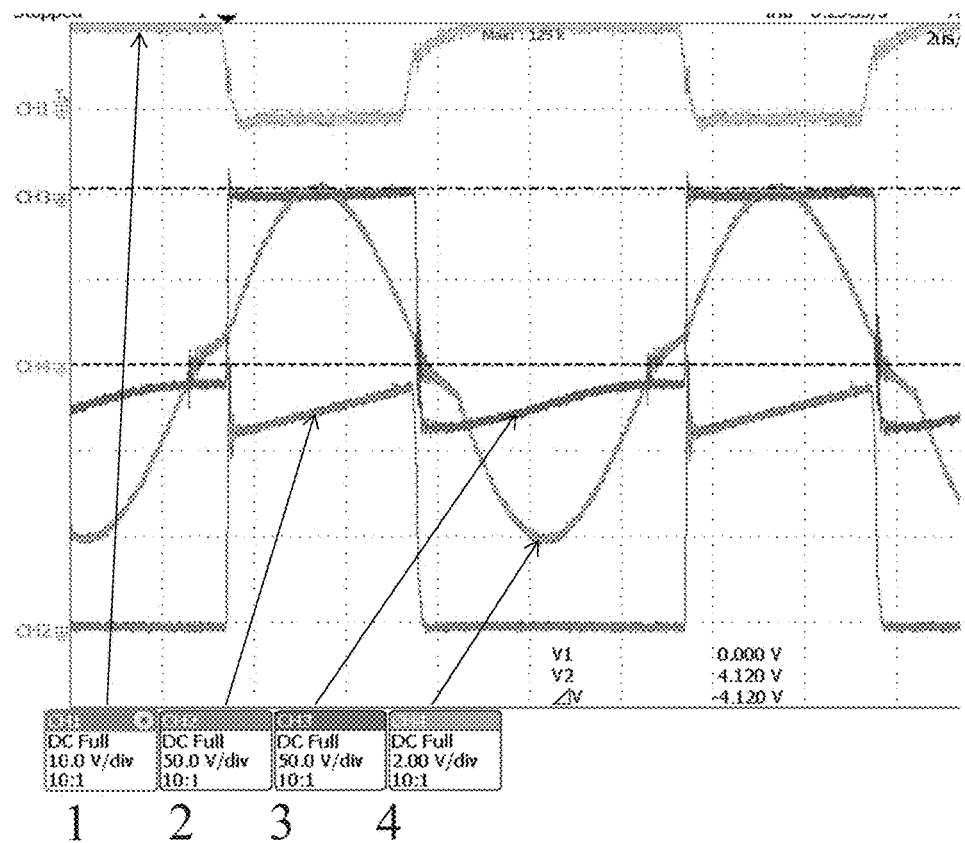
FIG. 17C (Duty cycle 60% Pout-11kW)

ISOLATED STEP-UP CONVERTER

CROSS-REFERENCE TO RELATED APPLICATIONS

This application claims priority to U.S. provisional application No. 62/326,893, filed Apr. 25, 2016, the contents of which are hereby incorporated by reference.

FIELD

The present invention relates generally to voltage converter systems and specifically to systems adapted to convert low direct-current (DC) input voltages to high DC or AC output voltages.

BACKGROUND & SUMMARY

The biggest challenge in designing step-up DC-DC converters relates to the ratio between output voltage and input voltage. The complexity of a DC-DC converter is inversely proportional to Vin/Iin. There is an even bigger problem when power in the range of 2-4 kW and higher with input voltage in the range of 10-12 VDC are required. As depicted in FIG. 15, when the ratio between input voltage and input current (Vin/Iin) is above 1, the problem will be smaller. i.e. The higher the number, the smaller the problem.

When the ratio is below 1, the problem increases as the ratio drops. For example, 10 VDC and 1000 ADC is problematic. The requirement for DC-DC isolation conversion with power in the range of 20-30 kW for automotive application is not rare. A common requirement is 24 VDC to 400 VDC and 48 VDC to 400 VDC. In this case, engineers typically connect a number of power stages in parallel. This works somewhat, but it has a big disadvantage: there are too many active switches and transformers, which require complex control, higher costs, and reduced reliability.

One key advantage of the present invention is reduction in complexity of the power transformer. The voltage across the low voltage side of transformer is, on average, twice higher than the input voltage, so the current via the low voltage side of the transformer will have an average value of half of the input current. This results in a reduction in the turns ratio of the transformer and as a result the design and the construction of the transformer will be easier, the efficiency of the transformer will increase, and the cost will be reduced. Additional objects and advantages are achieved because the topology of the present invention does not require a big block capacitor and has a relatively small ripple current on low voltage side—because of input inductors.

FIG. 1 depicts one embodiment of the present invention. FIGS. 1A & 1B depict a schematic diagram of a simplified/representative view of FIG. 1, used in some cases for ease of discussion. The regulation of output voltage is accomplished by changing the duty cycle of switches S1 and S3. The switching of S2 and S4 is complementary to the switching of S1 and S3 (i.e. S1 & S4 open when S2 & S3 closed, and vice versa).

The power stage has 3 modes of operation: Duty cycle of 50% wherein "on" time of S1 and S3 is half of commutation frequency, duty cycle of less than 50% wherein "on" time is less than half of the commutation frequency, and duty cycle of greater than 50% wherein "on" time is more than half of the commutation frequency. The selection of a mode will be determined by how much gain is required. In other words, the ratio between input and output voltage. Capacitors C1 and C2 will charge to an average voltage following this formula.

In one preferred embodiment, capacitors C1 and C2 are big enough so that we can ignore the ripple voltage, inductors L1 and L2 are big enough so that we can ignore ripple current, and the resonant frequency of resonant circuit Lr and Cr is equal to the commutation frequency.

FIGS. 5A-6B show operational characteristics for a 50% duty cycle. Starting at time t0, Capacitors C1 and C2 are charged with a polarity as shown in FIG. 5B. At time t0 S1 is turned-on and current from source V1 flows via inductor L1 and S1. At the same time (t0) S4 is turned-on and completes a circuit to discharge C1 via the resonant circuit Lr and Cr through the load. The current in this circuit starts from zero, will be sinusoidal in waveform, and reaches zero at time t1. At the same time S4 completes a circuit to charge C2 through inductor L2, since S3 is turned-off this time. The switch S4 has to be bidirectional because current flows through it in both directions. The current via S4 starts equal with the current in inductor L2 and decays because the current from capacitor C1 is in the opposite direction, and when current in capacitor C1 reaches maximum the current via switch S4 will have reversed direction. When the current in C1 reaches zero (time t1) the current via S4 will be the same as at time t0. At time t1 S1 and S4 are turned-off, S3 and S2 are turned-on, and new half cycle (t1-t2) starts, similar to period t041, but the current flowing via resonant circuit will be in the opposite direction to that during the period t041.

FIGS. 7A-10B show operational characteristics for an approximately 40% duty cycle. Starting at time t0, switch S4 is ON. The current via S1 begins with the same value as the current in L1, and discharges capacitor C1 via resonant circuit. The current via S4 at time t0 is equal to the current via L2 and will be reduced by the current from C1 because it flows in the opposite direction to the current from L2. At time t1 S1 is turned-off, interrupting the current which will be the summary of the current in L1 and the current flowing through C1 and resonant circuit. Also at time t1, S2 turns on and current flows via S2 matching the current which was interrupted by S1. The current via resonant circuit at t1 starts to decay and at time t2 it will be zero. Between t2 and t3 currents flow via S2 and S4 and matching the currents via L1 and L2. At time t3, S3 turns on and S4 turns off beginning a new conduction period (t3-t4), similar to time period t0-t3.

FIGS. 11A-14B show operational characteristics for an approximately 60% duty cycle. Starting at time t0, S1 is staying "on" conducting current via inductor L1. Also at time t0, S3 turns-off and S4 turns-on. This commutation completes a circuit to discharge C1 via resonant circuit. This current is starting from zero and rising sinusoidally. At time t1 switch S4 turns-off and S3 turns-on. This commutation event provides a path for current to flow via resonant circuit to C2 and S3. So, switch S3 carries the summary of two currents, one from L2 and another one from resonant circuit, but they are in opposite directions. The current via resonant circuit will linearly decay, and at time t2 it reaches zero. In time period t2-t3, current will flow only via S1 and S3, and will be equal to the currents in L1 and L2, respectively. At time t3, switch S1 turns-off and S2 turns-on and a new period begins (t3-t4), similar to period t0-t3.

Other configurations may be used with resonant capacitors. In one embodiment, capacitors C1 and C2 are the resonant Capacitors, Switches S1 and S3 turn-off purely ZVS (Zero Voltage Switched) under full load. When capacitors C1 and C2 are of small value, the resonant capacitance will be determined by the combination of capacitors C1, C2 and the capacitor which is connected in series with resonant inductor Lr. In this case, the ripple voltage on capacitors C1 and C2 can be high under full load.

When capacitors C1 and C2 are the resonant capacitors, the ripple voltage on C1 and C2 can reach 100% under full load conditions and switches S1 and S4 will turn-off under purely ZVS. It should be noted that in practical implementation, switches S1 and S3 turn-on under ZCS (Zero Current Switched) conditions, because practically there will always be a small inductor which is connected in series with capacitors C1 and C2. All this helps to significantly reduce switching losses. This topology has many varieties of behavior which depend on value of capacitors C1 and C2. It should also be noted that RMS current via these capacitors is almost equal to RMS current via the primary transformer winding. The foregoing considerations necessitate that attention should be paid to the selection of value and type of these capacitors.

FIGS. 17A through 17C depict 50%, 40%, 60% duty cycles, respectively, wherein Ch1=gate S1, Ch2=S1, Ch3=S2, & Ch4=current via low voltage side of transformer; 80 A/div. The following table shows the measured results.

TABLE measured results (FIGS. 17A through 17C)

| Vin | Vout | Pout W | Eff |
|---|---|---|---|
| 10.5 | 170 | 1600 | 0.935 |
| 15 | 170 | 2100 | 0.94 |
| 22 | 380 | 3100 | 0.945 |
| 27 | 380 | 3100 | 0.944 |
| 30 | 380 | 3100 | 0.941 |
| 52 | 380 | 11000 | 0.94 |
| 60 | 380 | 10000 | 0.945 |
| 80 | 380 | 11000 | 0.94 |

FIG. 2 depicts a DC-AC converter without a DC-link. The following table shows the practical results from this DC-AC converter. In this case the converter can operate as a bidirectional converter and operate as a charger.

TABLE (DC-AC converter of FIG. 2)

| Vin | Vout | PoutW | Eff |
|---|---|---|---|
| 11 | 120 | 1000 | 0.921 |
| 12 | 120 | 1200 | 0.927 |
| 14 | 120 | 1200 | 0.931 |

In this case, the converter can operate as a bidirectional converter. For step-up DC-DC isolation converters with input voltage below 100 VDC, it is reasonable to use paralleling when the input current is over 600-700 A. The cost of paralleling below this current will be at least twice as high as a single stage under the same conditions (Vin, Pout, efficiency, and commutation frequency).

The following tables show comparisons of real implementations of these topologies. The cost of the proposed topology is smaller than that of others and it has a wider application area. The proposed topology has better results as far as cost and application area by Vin, but it is limited by capacitors C1 and C2. In other words, more attention should be paid to the selection of these parts. Power transformer characteristics are improved by reduction of turn ratio. Additionally, it is very reasonable to use this topology for DC-AC converter without DC-link, when input ripple current is not desired. The paralleling input power stages have minimum twice higher cost and are not competitive. In other words, the proposed topology is a better solution for higher power at low voltage than parallel input stages.

The technical aspects and cost characteristics of the proposed topology (FIG. 1) is compared to the topologies depicted in FIGS. 3 & 4. The comparison of cost per kW was made according to the following norms: Vin, Vout, Pout and efficiency are the same for each topology. The following table shows a comparison of the proposed topology of the present invention ("Prop") vs N1 (FIG. 3), N2 (FIG. 4), & DAB (Double Active Bridge). The latter having received a lot of attention.

TABLE

| | Max | Vin | Vout | Comm | Limit by | Sw | Ind | Block C | Cost 1 kW |
|---|---|---|---|---|---|---|---|---|---|
| DAB | 150 A | 10-100 | 0-1000 | 50 kHz | Turn-off | 8 | no | Huge | 1.3-1.5 |
| N1 | 200 A | 30-100 | 0-1000 | 100 kHz | Turn-off | 4 | 2 | no | 1.2-1.4 |
| N2 | 600 A | 10-40 | Vmax/Vmin = 2 | 300 kHz | X-form | 6 | no | 1 | 1.1-1.2 |
| Prop | 600 A | 10-100 | 0-1000 | 200 kHz | C1 & C2 | 4 | 2 | no | 1.0 |

The following table shows comparisons of implementations of the aforementioned topologies. As can be seen, the cost of the proposed topology is lower than that of others and it has a wider application area. Also, it is very reasonable to use this topology for a DC-AC converter without a DC-link, when low input ripple current is desired. Finally, the proposed topology is a better solution for higher power at low voltage than parallel input stages.

TABLE

| | Pout | Vin | Vout | Comm | Eff |
|---|---|---|---|---|---|
| DAB | 1.7 kW | 10-14 | 360 | 20 kHz | 92.0 |
| DAB | 2.4 kW | 30 | 750 | 40 kHz | 94.5 |

TABLE-continued

|  | Pout | Vin | Vout | Comm | Eff |
|---|---|---|---|---|---|
| N1 | 1.0 kW | 20-50 | 350 | 50 kHz | 95.8 |
| N1 | 1.4 kW | 12 | 300 | 20 kHz | 92.0 |
| N1 | 1.6 kW | 12 | 300 | 20 kHz | 88.0 |
| N2 | 3.5 kW | 10.5-16 | 360 | 150 kHz | 93.5 |
| N2 | 7.5 kW | 20-30 | 600 | 120 kHz | 94.0 |
| Prop | 1.7 kW | 10.5-15 | 170 | 120 kHz | 93.5 |
| Prop | 3.1 kW | 22-30 | 380 | 120 kHz | 94.5 |
| Prop | 7.0 kW | 42-72 | 380 | 100 kHz | 96.5 |

Table

Examples of component values for different resonance configurations for a sample converter with 12V input, 360V output at 2.8 kW:

| Component | Primary side resonance | Secondary side resonance | Combined Resonance |
|---|---|---|---|
| C1/C2 | 10 uF | 400 uF | 24 uF |
| C3/C5 | 10 uF | 0.1 uF | 0.1 uF |
| L3 | 6.5 uH | 6 uH | 8.5 uH |

BRIEF DESCRIPTION OF THE DRAWINGS

Further features of the inventive embodiments will become apparent to those skilled in the art to which the embodiments relate from reading the specification and claims with reference to the accompanying drawings, in which:

FIG. 1 depicts a schematic diagram of one embodiment of the present invention;

FIG. 1A depicts a schematic diagram of a simplified/representative view of FIG. 1;

FIG. 2 depicts a schematic diagram of one embodiment of the present invention;

FIG. 3 depicts a schematic diagram of a prior art topology (Topology N1);

FIG. 4 depicts a schematic diagram of a prior art topology (Topology N2);

FIG. 1B depicts a schematic diagram of a simplified/representative view of FIG. 1;

FIG. 17A depicts a waveform diagram (50% duty cycle);

FIG. 17B depicts a waveform diagram (40% duty cycle); and

FIG. 17C depicts a waveform diagram (60% duty cycle).

DETAILED DESCRIPTION

Figure 5A:
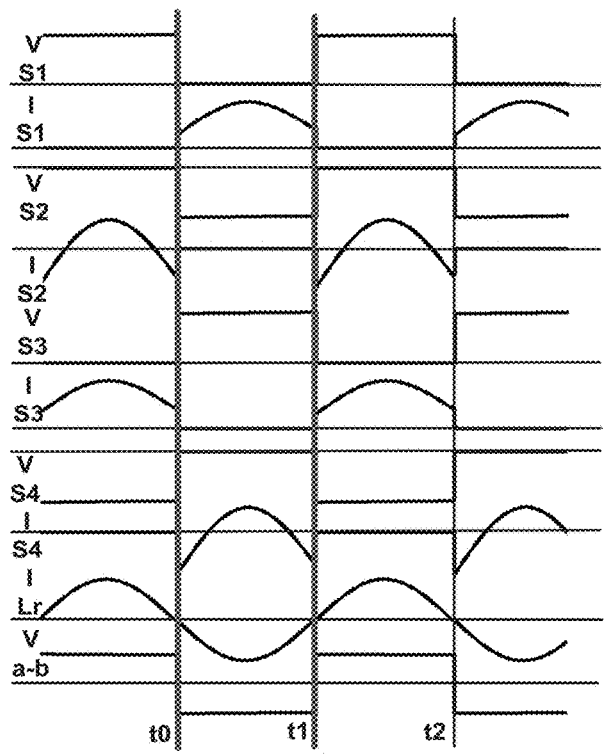
FIG. 5A depicts a waveform diagram for time t0 to t1 (50% duty cycle)
Figure 5B:
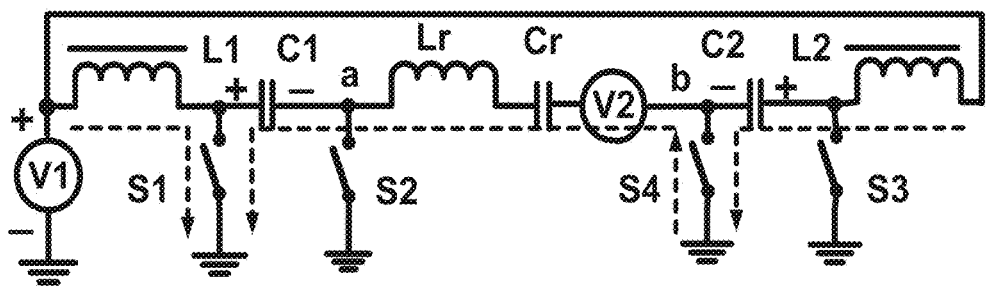
FIG. 5B depicts a schematic diagram of a simplified/representative view of FIG. 1.
Figure 6A:
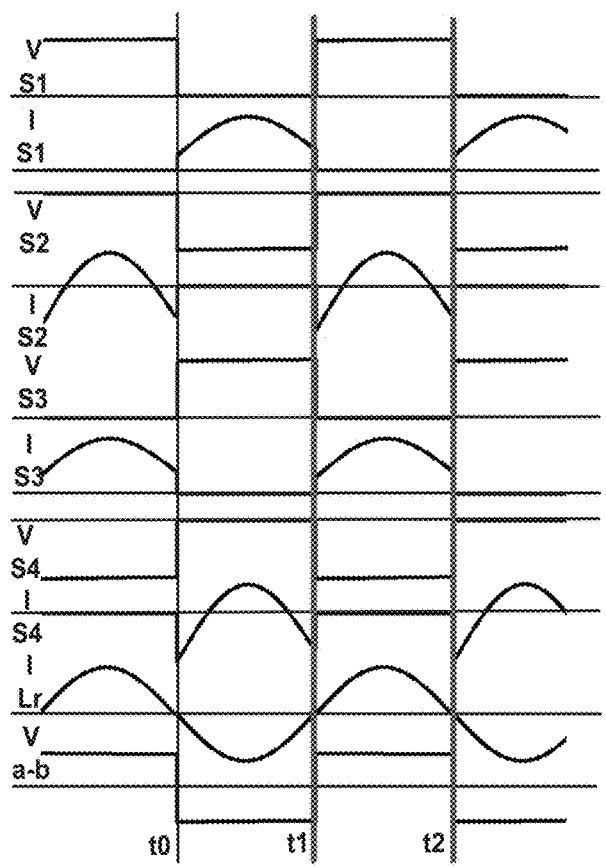
FIG. 6A depicts a waveform diagram for time t1 to t2 (50% duty cycle)
Figure 6B:
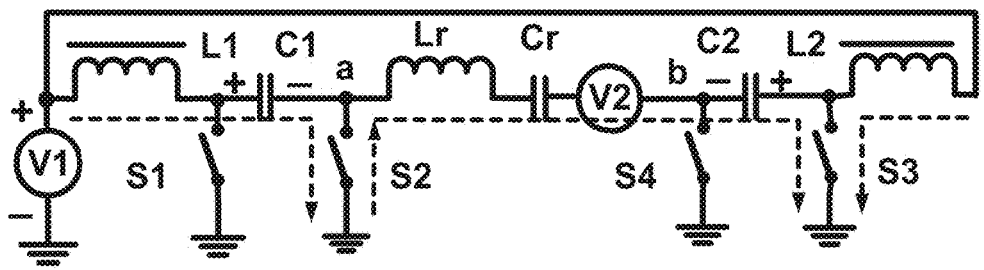
FIG. 6B depicts a schematic diagram of a simplified/representative view of FIG. 1.
Figure 7A:
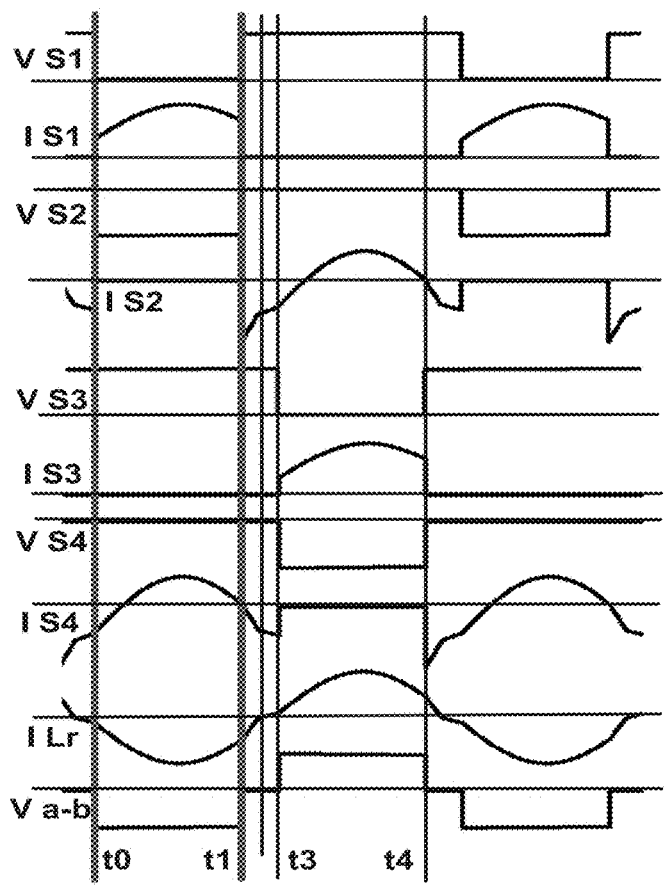
FIG. 7A depicts a waveform diagram for time t0 to t1 (40% duty cycle)
Figure 7B:
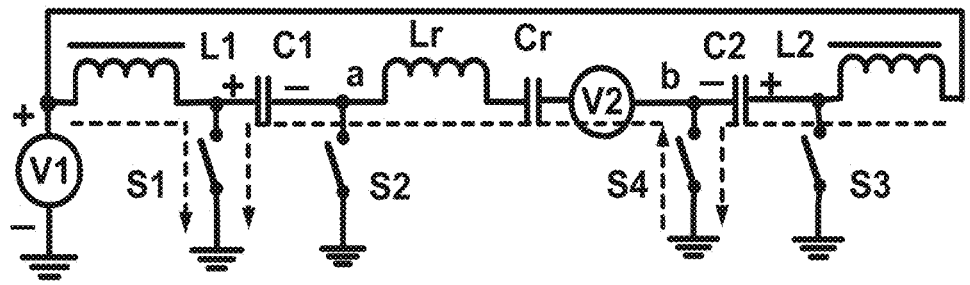
FIG. 7B depicts a schematic diagram of a simplified/representative view of FIG. 1.
Figure 8A:
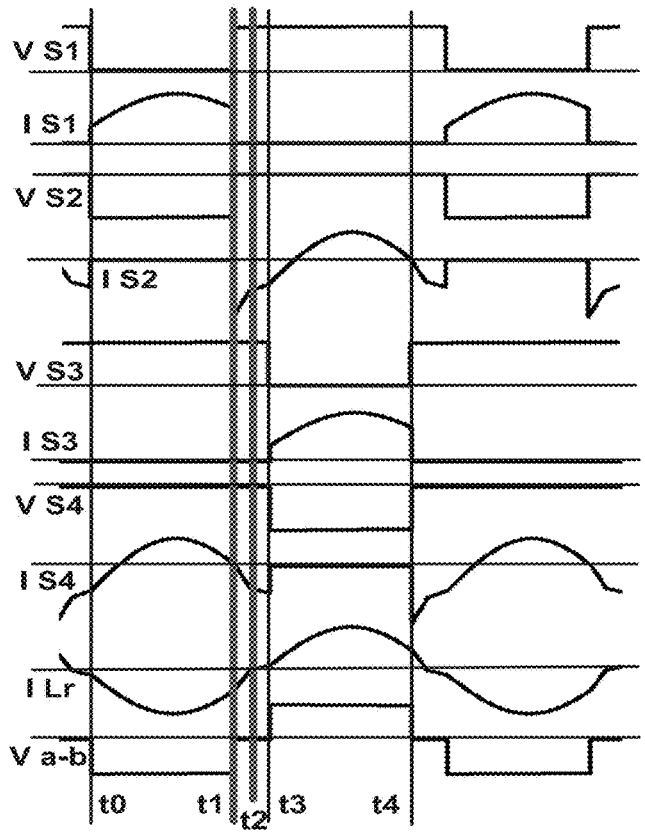
FIG. 8A depicts a waveform diagram for time t1 to t2 (40% duty cycle)
Figure 8B:
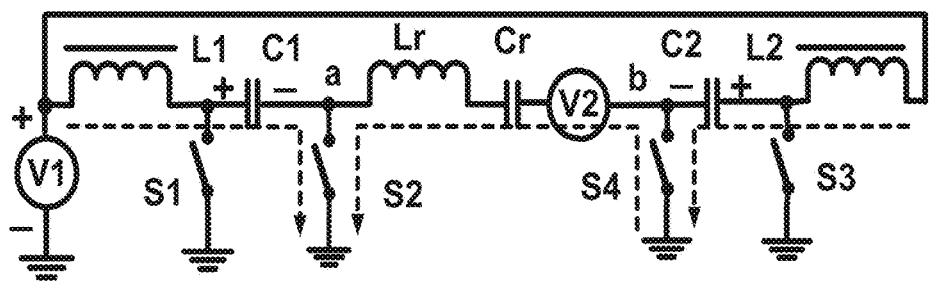
FIG. 8B depicts a schematic diagram of a simplified/representative view of FIG. 1.
Figure 9A:
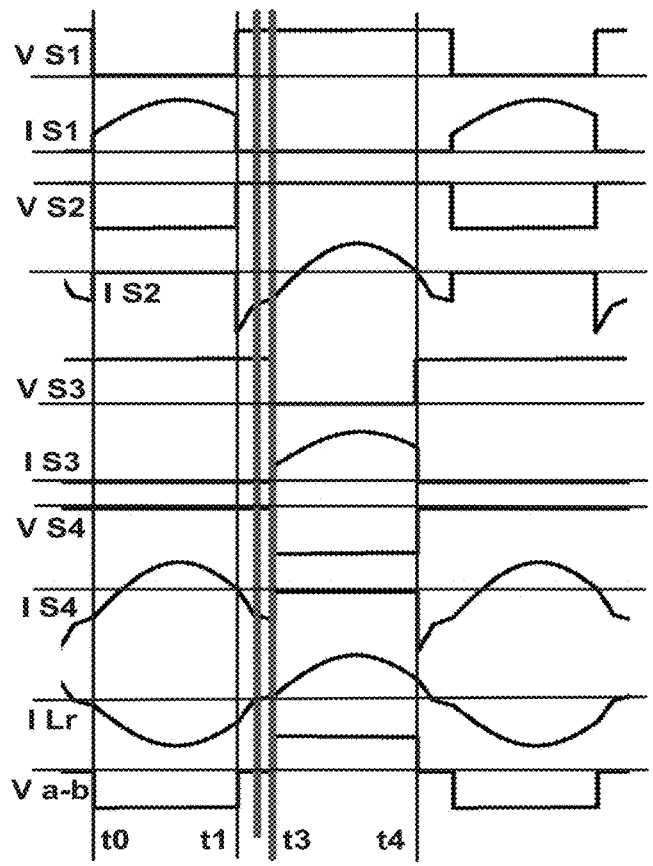
FIG. 9A depicts a waveform diagram for time t2 to t3 (40% duty cycle)
Figure 9B:
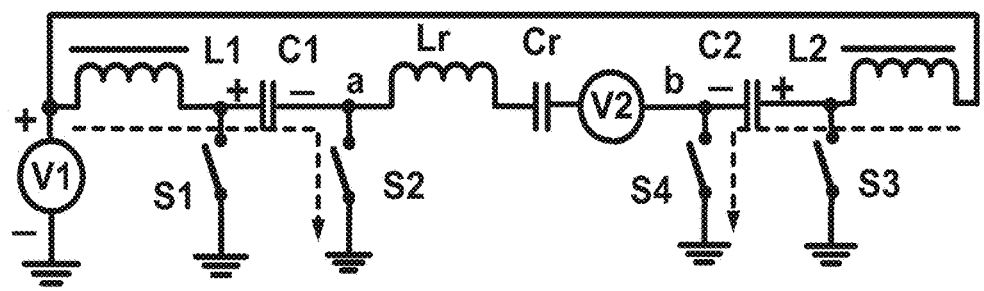
FIG. 9B depicts a schematic diagram of a simplified/representative view of FIG. 1.
Figure 10A:
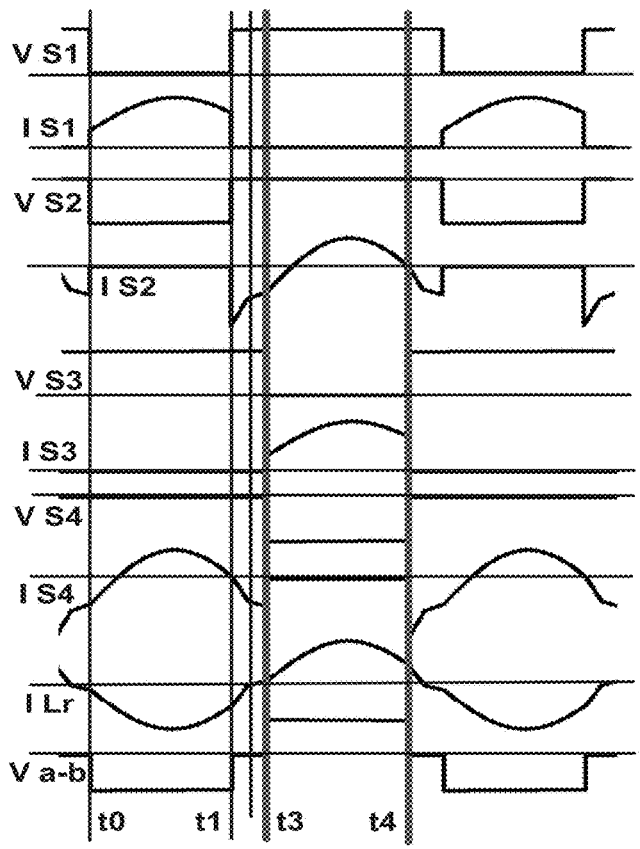
FIG. 10A depicts a waveform diagram for time t3 to t4 (40% duty cycle)
Figure 10B:
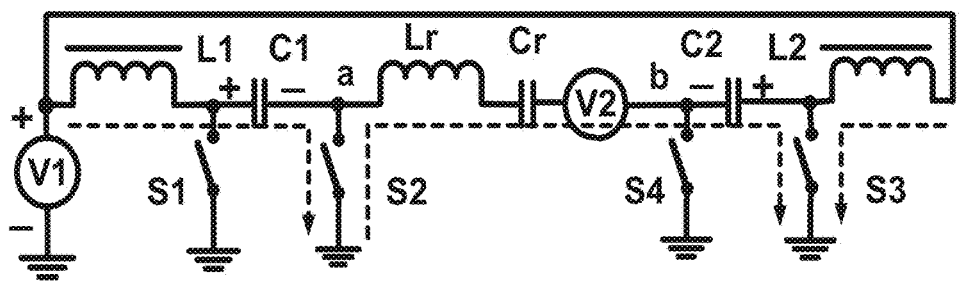
FIG. 10B depicts a schematic diagram of a simplified/representative view of FIG. 1.
Figure 11A:
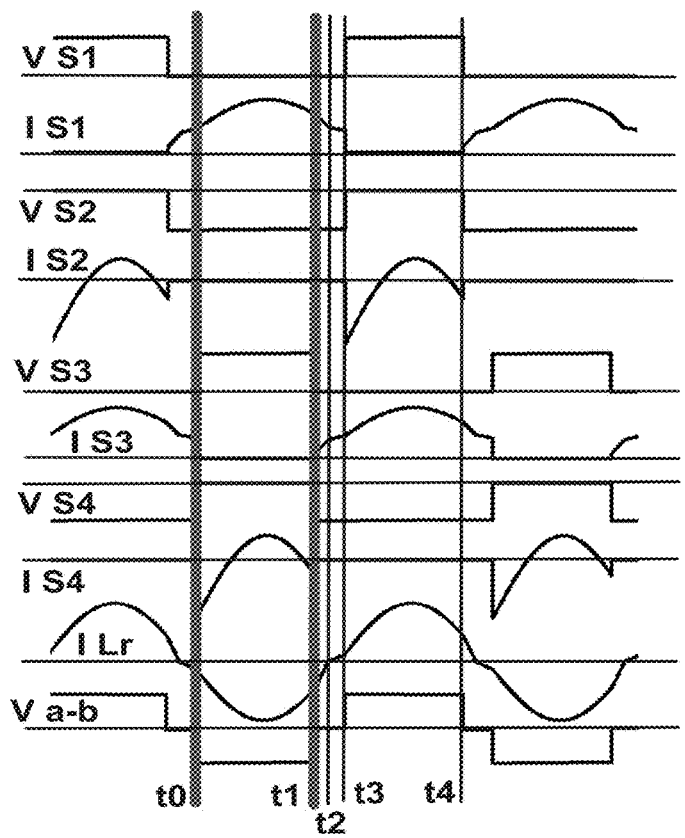
FIG. 11A depicts a waveform diagram for time t0 to t1 (60% duty cycle)
Figure 11B:
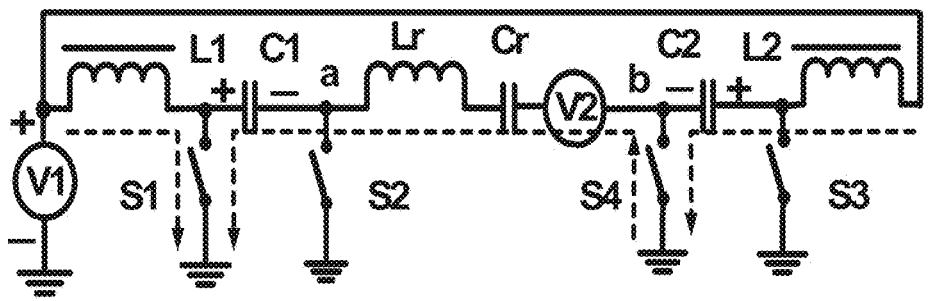
FIG. 11B depicts a schematic diagram of a simplified/representative view of FIG. 1.
Figure 12A:
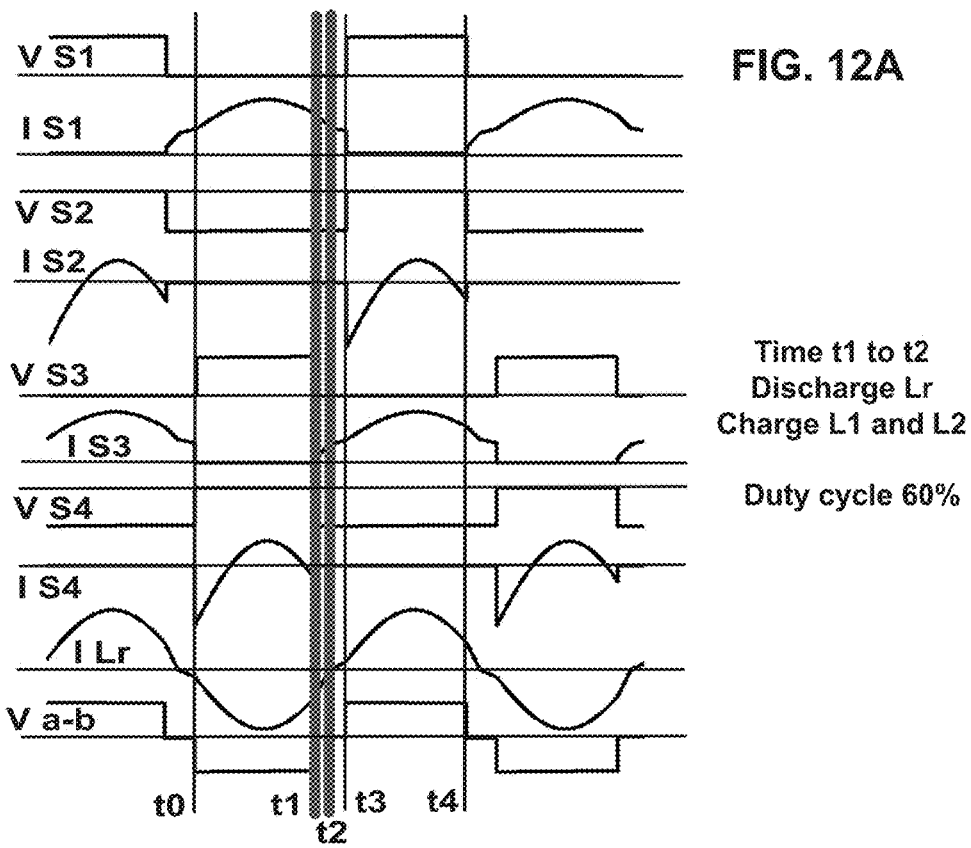
FIG. 12A depicts a waveform diagram for time t1 to t2 (60% duty cycle)
Figure 12B:
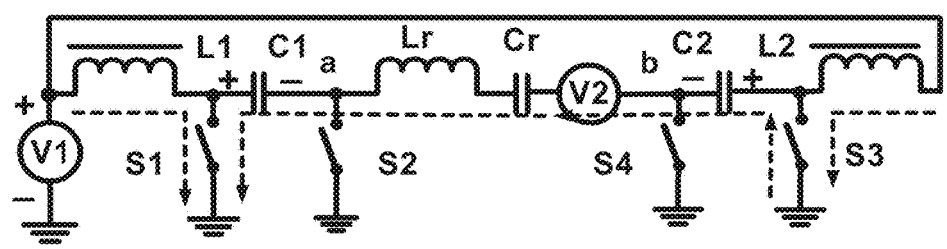
FIG. 12B depicts a schematic diagram of a simplified/representative view of FIG. 1.
Figure 13A:
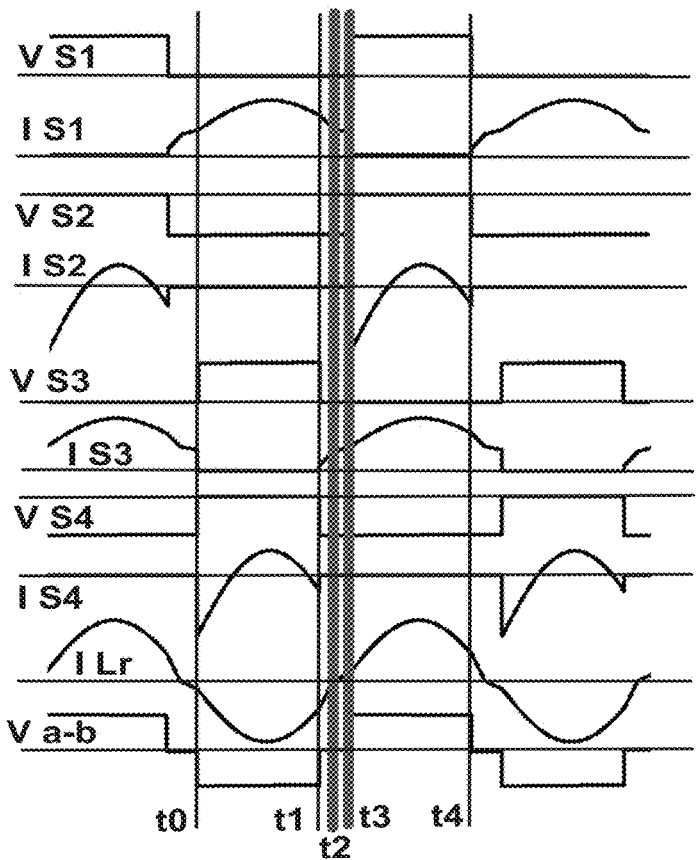
FIG. 13A depicts a waveform diagram for time t2 to t3 (60% duty cycle)
Figure 13B:
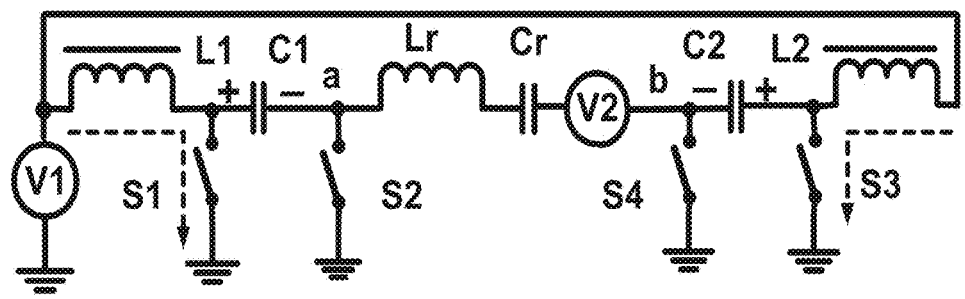
FIG. 13B depicts a schematic diagram of a simplified/representative view of FIG. 1.
Figure 14A:
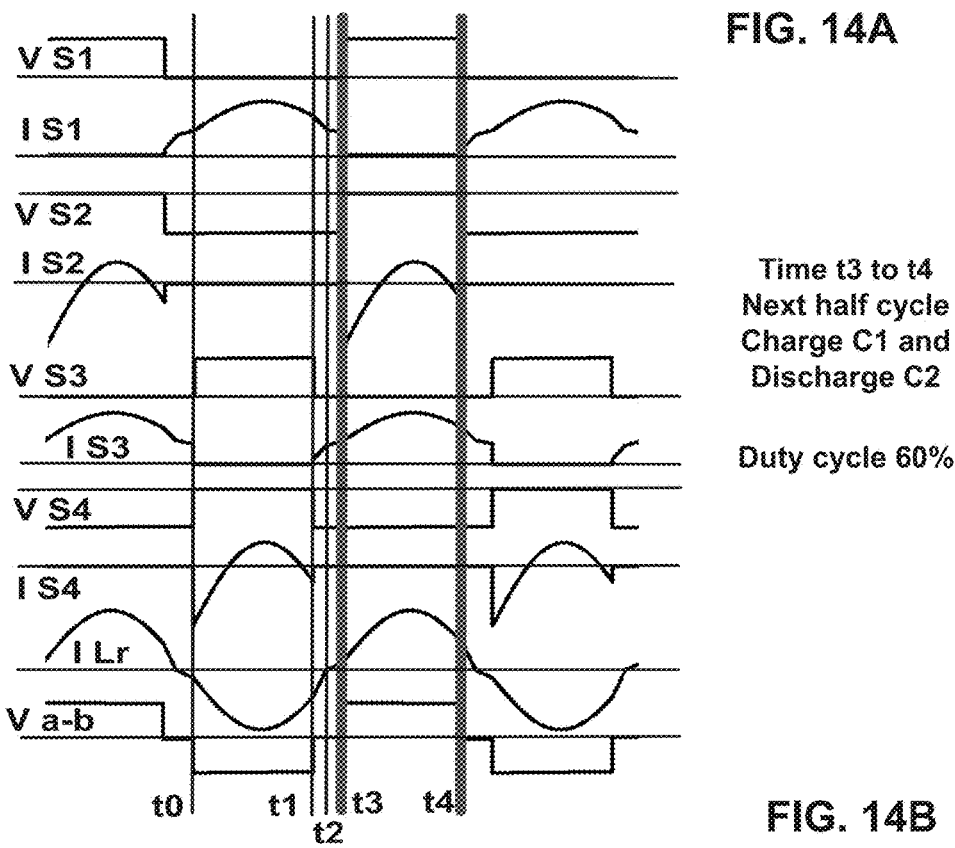
FIG. 14A depicts a waveform diagram for time t3 to t4 (60% duty cycle)
Figure 14B:
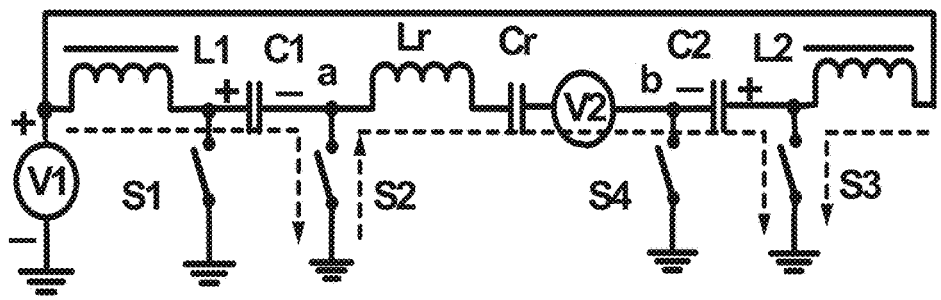
FIG. 14B depicts a schematic diagram of a simplified/representative view of FIG. 1.
Figure 15:
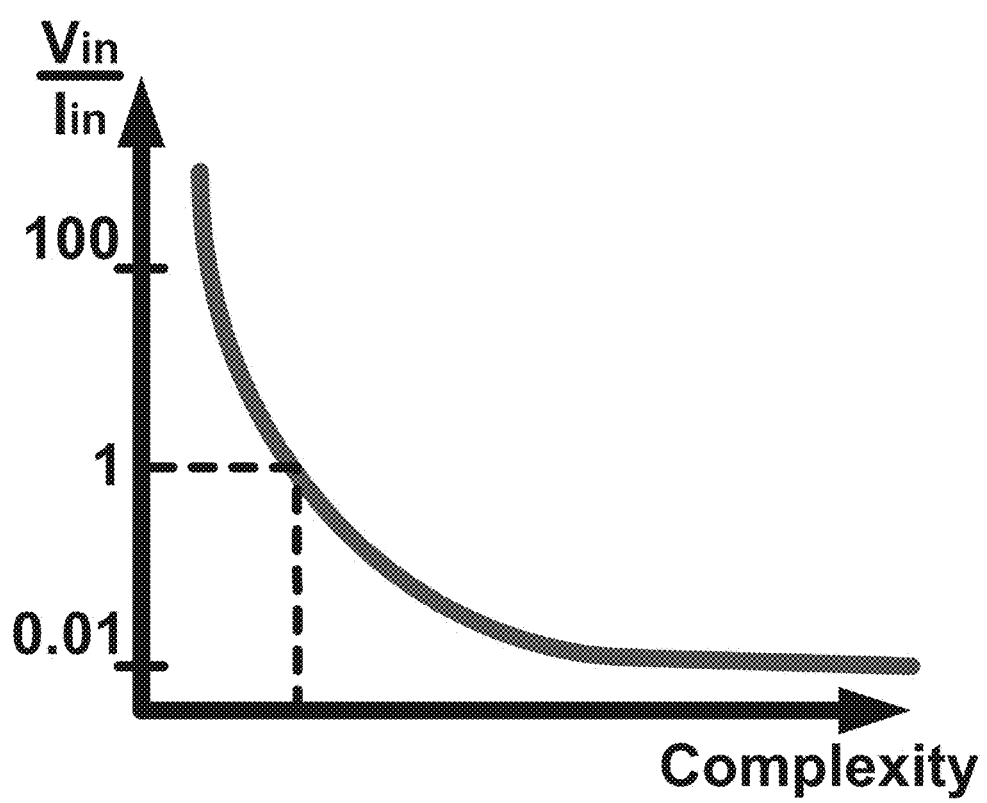
FIG. 15 depicts a graph showing the complexity of DC-DC converter is inversely proportional to Vin/Iin.
Figure 16A:
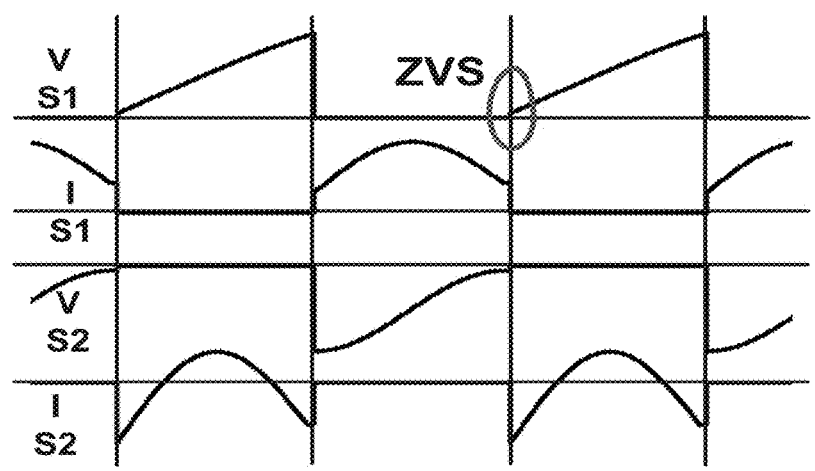
FIG. 16A depicts a waveform diagram for an alternative embodiment.
Figure 16B:
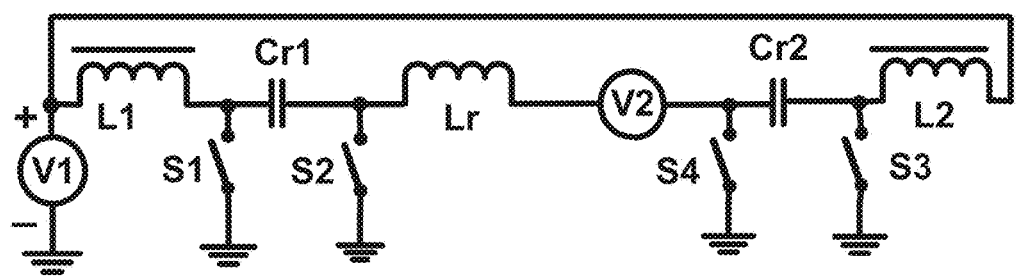
FIG. 16B depicts a schematic diagram of a simplified/representative view of FIG. 16A.

FIG. 1 depicts one embodiment of the invention wherein a step-up converter 100 has first and second isolated stages, 101, 102, the first isolated stage comprises, a DC power source V1; a first inductor L1 having a first terminal 103 connected to the DC power source and a second terminal 104 connected to a first terminal 105 of a first capacitor C1; a second terminal 106 of the first capacitor C1 connected to a first terminal 119 of a primary stage 131 of a transformer Tr; a second inductor L2 having a first terminal 111 connected to the DC power source V1 and a second terminal 112 connected to a first terminal 113 of a second capacitor C2; a second terminal 114 of the second capacitor C2 connected to a second terminal 120 of the primary stage 131 of the transformer Tr; a first switch S1 having a first terminal 107 connected to the second terminal 104 of the first inductor L1 and to the first terminal 105 of the first capacitor C1, the first switch S1 having a second terminal 108 connected to ground; a second switch S2 having a first terminal 109 connected to the second terminal 106 of the first capacitor C1 and to the first terminal 119 of the primary stage 131 of the transformer Tr, the second switch S2 having a second terminal 110 connected to ground; a third switch S3 having a first terminal 115 connected to the second terminal 112 of the second inductor L2 and to the first terminal 113 of the second capacitor C2, the third switch S3 having a second terminal 116 connected to ground; and a fourth switch S4 having a first terminal 117 connected to the second terminal 114 of the second capacitor C2 and to the second terminal 120 of the primary stage 131 of the transformer Tr, the fourth switch S4 having a second terminal 118 connected to ground. In one embodiment, step-up converter 100 comprises at least one of the first, second, third, or fourth switches, S1, S2, S3, S4 respectively, being bidirectional. In one embodiment, step-up converter 100 comprises the fourth switch S4 being bidirectional.

FIG. 1 depicts one embodiment of the invention wherein the second isolated stage 102 comprises a first diode 133 having a first terminal 122 connected to a first node 135, and a second terminal 121 connected to a second node 136; a second diode 134 having a first terminal 138 connected to the second node 136, and a second terminal 139 connected to a third node 137; a secondary transformer stage 132 having a first terminal 123 connected to the second node 136, and a second terminal 124 connected to a first terminal 125 of a resonant inductor Lr; a second terminal 126 of the resonant inductor Lr connected to a second terminal 128 of a first resonant capacitor Cr1, and to a first terminal 129 of a second resonant capacitor Cr2; a first terminal 127 of the first resonant capacitor Cr1 connected to the first node 135; and a second terminal 130 of the second resonant capacitor Cr2 connected to the third node 137; whereby a load RL can be connected between the first and third nodes 135, 137. The second isolated stage 101 of FIG. 1 provides a DC voltage.

In one embodiment, the second isolated stage 102 comprises, the resonant inductor Lr and first and second resonant capacitors Cr1, Cr2, having a resonant frequency equal to a commutation frequency. FIG. 2 depicts one embodiment of the invention wherein the second isolated stage 200 comprises, a fifth switch S5 having a first terminal 204 connected to a first node 205, and a second terminal 203 connected a first terminal 202 of a sixth switch S6; the second terminal 201 of the sixth switch S6 connected to a second node 224; a seventh switch S7 having a first terminal 219 connected to the second node 224, and a second terminal 220 connected to a first terminal 221 of an eighth switch S8; a second terminal 222 of the eighth switch S8 connected to a third node 218; a secondary transformer stage 211 having a first terminal 210 connected to the second node 224, and a second terminal 212 connected to a first terminal 213 of a resonant inductor 225; a second terminal 214 of the resonant inductor 225 connected to a second terminal 207 of a first resonant capacitor Cr1', and to a first terminal 216 of a second resonant capacitor Cr2'; a first terminal 206 of the first resonant capacitor connected to the first node 205; a second terminal 217 of the second resonant capacitor connected to the third node 218; and a third capacitor 215 connected between the first and third nodes 205, 218; whereby a load RL can be connected between the first and third nodes 205, 218. The second isolated stage 200 of FIG. 2 has an AC output across the load whereas the second isolated stage 101 of FIG. 1 provides a DC voltage.

While this invention has been shown and described with respect to detailed embodiments thereof, it will be understood by those skilled in the art that changes in form and detail thereof may be made without departing from the scope of the claims of the invention.

What is claimed is:

1. A step-up converter having first and second isolated stages, the first isolated stage comprising:
   a DC power source;
   a first inductor having a first terminal connected to the DC power source and a second terminal connected to a first terminal of a first capacitor;
   a second terminal of the first capacitor connected to a first terminal of a primary stage of a transformer;
   a second inductor having a first terminal connected to the DC power source and a second terminal connected to a first terminal of a second capacitor;
   a second terminal of the second capacitor connected to a second terminal of the primary stage of the transformer;
   a first switch having a first terminal connected to the second terminal of the first inductor and to the first terminal of the first capacitor, the first switch having a second terminal connected to a ground;
   a second switch having a first terminal connected to the second terminal of the first capacitor and to the first terminal of the primary stage of the transformer, the second switch having a second terminal connected to the ground;
   a third switch having a first terminal connected to the second terminal of the second inductor and to the first terminal of the second capacitor, the third switch having a second terminal connected to the ground; and
   a fourth switch having a first terminal connected to the second terminal of the second capacitor and to the second terminal of the primary stage of the transformer, the fourth switch having a second terminal connected to the ground.

2. The step-up converter of claim 1 further comprising:
   at least one of the first, second, third, or fourth switches being bidirectional.

3. The step-up converter of claim 1 further comprising:
   the fourth switch being bidirectional.

4. The step-up converter of claim 1 wherein the second isolated stage comprises:
   a first diode having a first terminal connected to a first node, and a second terminal connected to a second node;
   a second diode having a first terminal connected to the second node, and a second terminal connected to a third node;
   a secondary transformer stage having a first terminal connected to the second node, and a second terminal connected to a first terminal of a resonant inductor;
   a second terminal of the resonant inductor connected to a second terminal of a first resonant capacitor, and to a first terminal of a second resonant capacitor;
   a first terminal of the first resonant capacitor connected to the first node; and
   a second terminal of the second resonant capacitor connected to the third node.

5. The step-up converter of claim 4 further comprising:
   the resonant inductor and first and second resonant capacitors having a resonant frequency equal to a commutation frequency.

6. The step-up converter of claim 1 wherein the second isolated stage comprises:
   a fifth switch having a first terminal connected to a first node, and a second terminal connected a first terminal of a sixth switch;
   a second terminal of the sixth switch connected to a second node;
   a seventh switch having a first terminal connected to the second node, and a second terminal connected to a first terminal of an eighth switch;
   a second terminal of the eighth switch connected to a third node;
   a secondary transformer stage having a first terminal connected to the second node, and a second terminal connected to a first terminal of a resonant inductor;
   a second terminal of the resonant inductor connected to a second terminal of a first resonant capacitor, and to a first terminal of a second resonant capacitor;
   a first terminal of the first resonant capacitor connected to the first node;

a second terminal of the second resonant capacitor connected to the third node; and a third capacitor connected between the first and third nodes.

* * * * *